(12) United States Patent
Kimura et al.

(10) Patent No.: US 12,190,921 B2
(45) Date of Patent: Jan. 7, 2025

(54) DISK DEVICE AND HEAD STACK ASSEMBLY HAVING DAMPER ON INCLINED SURFACE OF LOAD BEAM

(71) Applicants: Kabushiki Kaisha Toshiba, Tokyo (JP); Toshiba Electronic Devices & Storage Corporation, Tokyo (JP)

(72) Inventors: Ryusuke Kimura, Yokohama Kanagawa (JP); Yusuke Nojima, Yokohama Kanagawa (JP); Yasutaka Sasaki, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/446,944

(22) Filed: Aug. 9, 2023

(65) Prior Publication Data
US 2024/0221781 A1    Jul. 4, 2024

(30) Foreign Application Priority Data

Jan. 4, 2023    (JP) ................................ 2023-000020

(51) Int. Cl.
*G11B 5/48*    (2006.01)
*G11B 33/08*    (2006.01)

(52) U.S. Cl.
CPC ............ *G11B 5/4833* (2013.01); *G11B 33/08* (2013.01); *G11B 5/483* (2015.09)

(58) Field of Classification Search
None
See application file for complete search history.

(56) References Cited

U.S. PATENT DOCUMENTS

| 6,700,744 | B2 | 3/2004 | Nishida et al. | |
| 2024/0096356 | A1* | 3/2024 | Tokizaki | G11B 5/4833 |

FOREIGN PATENT DOCUMENTS

| JP | 3920270 B2 | 5/2007 |
| JP | 5296174 B2 | 9/2013 |

* cited by examiner

*Primary Examiner* — Craig A. Renner
(74) *Attorney, Agent, or Firm* — Kim & Stewart LLP

(57) ABSTRACT

According to one embodiment, a disk device includes an arm with a through hole, a base plate, a load beam, and a damper. The arm has a first surface and a second surface opposite the first surface. The base plate has a first protrusion in the through hole. The load beam is attached to the base plate and has a fourth surface and a fifth surface opposite the fourth surface. The first surface and the fourth surface faces one magnetic disk. The fifth surface is inclined so as to be closer to the one magnetic disk as is further away from the arm. The damper is attached to the fifth surface. A value obtained by dividing a first distance between the first surface and the second surface by a second distance between an end of the damper and an axis of the through hole is 0.11 or less.

9 Claims, 7 Drawing Sheets

US 12,190,921 B2

DISK DEVICE AND HEAD STACK ASSEMBLY HAVING DAMPER ON INCLINED SURFACE OF LOAD BEAM

CROSS-REFERENCE TO RELATED APPLICATIONS

This application is based upon and claims the benefit of priority from Japanese Patent Application No. 2023-000020, filed on Jan. 4, 2023, the entire contents of which are incorporated herein by reference.

FIELD

Embodiments described herein relate generally to a disk device and a head stack assembly.

BACKGROUND

Disk devices such as a hard disk drive include a head stack assembly (HSA) including head gimbal assemblies (HGA) and a carriage. Each HGA includes a magnetic head and is attached to an arm of the carriage. The carriage rotates to move the magnetic heads to their respective desired positions.

The positioning control of the magnetic head may be subjected to vibration of a load beam included in the HGA. For this reason, the disk device may additionally include a damper attached to the load beam. The damper works to attenuate the vibration of the load beam, if it occurs.

Two HGAs are attached to both sides of each arm. The dampers are attached to the load beam surfaces facing the other HGAs. Such arrangement may cause the dampers of the two HGAs attached to both sides of the arm to approach and interfere with each other.

DETAILED DESCRIPTION

In general, according to one embodiment, a disk device includes 11 or more magnetic disks, an arm with a through hole, a base plate, a load beam, and a damper. The arm is configured to rotate around a rotation axis, and has a first surface and a second surface. The first surface is spaced from the rotation axis in a first direction orthogonal to the rotation axis, to face one magnetic disk among the 11 or more magnetic disks. The second surface is opposite the first surface. The through hole is open to the first surface and the second surface. The base plate has a third surface and a first protrusion. The third surface faces the first surface. The first protrusion protrudes from the third surface to fit in the through hole. The load beam is attached to the base plate and has a fourth surface and a fifth surface. The fourth surface faces the one magnetic disk. The fifth surface is opposite the fourth surface and is inclined with respect to the first surface so as to be closer to the one magnetic disk as is further away from the arm. The damper is attached to the fifth surface. A value obtained by dividing a first distance between the first surface and the second surface by a second distance between an end of the damper and an axis of the through hole is 0.11 or less, the end of the damper being in a second direction opposite to the first direction.

Figure 1:
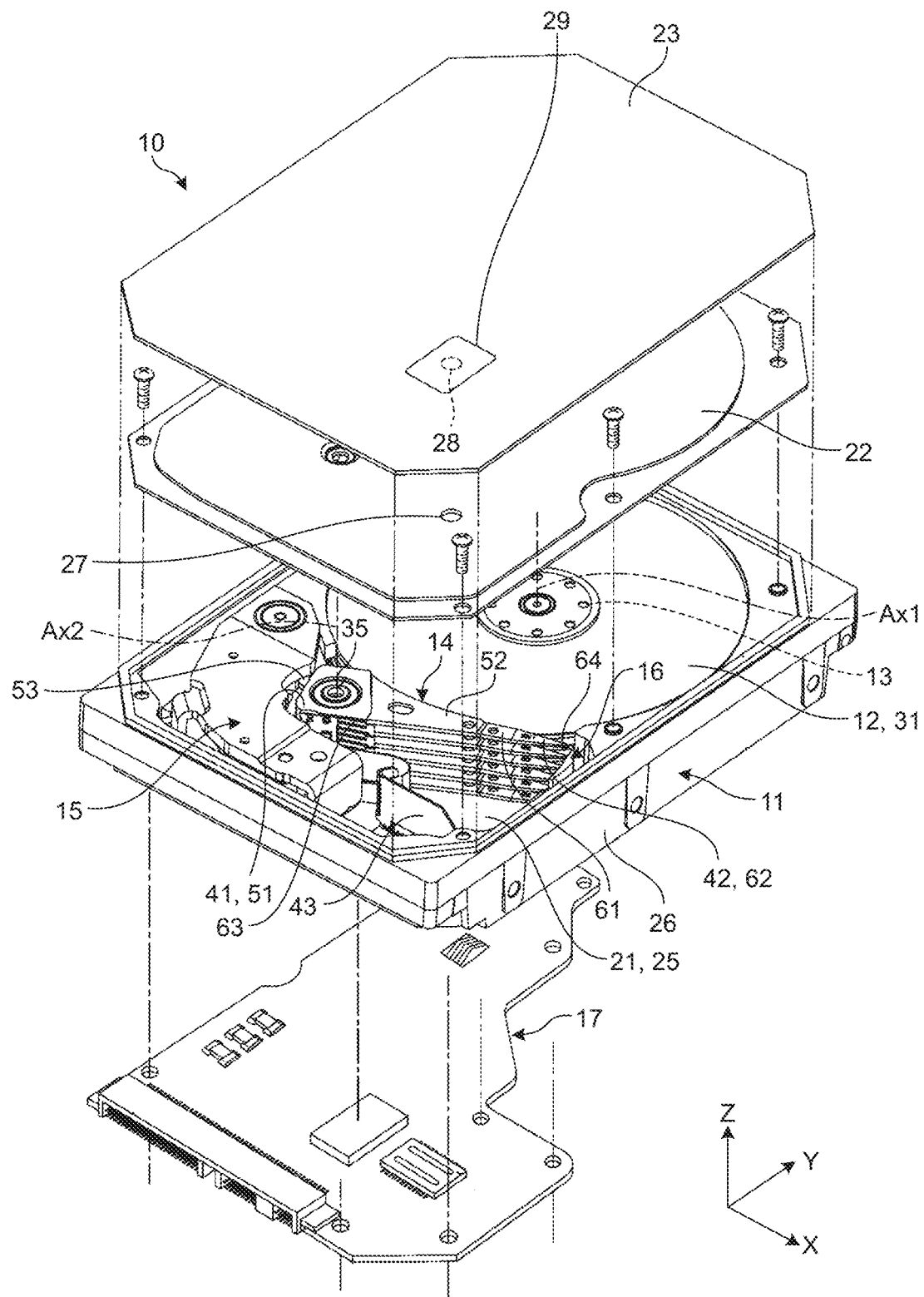
FIG. 1 is an exemplary perspective view illustrating an HDD according to one embodiment in an exploded manner.

FIG. 1 is an exemplary perspective view illustrating a hard disk drive (HDD) 10 according to the present embodiment in an exploded manner. The HDD 10 is an example of a disk device, and may also be referred to as an electronic device, a storage device, an external storage device, or a magnetic disk device.

As illustrated in FIG. 1, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The HDD 10 is not limited to this example.

The housing 11 includes a base 21, an inner cover 22, and an outer cover 23. Each of the base 21, the inner cover 22, and the outer cover 23 is made of metal such as aluminum alloy, for example.

The base 21 has a substantially rectangular parallelepiped box shape opened in the +Z direction. The plurality of magnetic disks 12, the spindle motor 13, the HSA 14, the VCM 15, and the ramp load mechanism 16 are housed inside the base 21.

The base 21 has a bottom wall 25 and a side wall 26. The bottom wall 25 has a substantially rectangular (quadrangular) plate shape and stands substantially orthogonal to the Z direction. The side wall 26 protrudes in the substantially +Z direction from the edge of the bottom wall 25 and has a substantially rectangular frame shape. The bottom wall 25 and the side wall 26 are integrated together.

The inner cover 22 is attached to the end of the side wall 26 in the +Z direction with, for example, a screw. The outer cover 23 covers the inner cover 22 and is attached to the end of the side wall 26 in the +Z direction by welding, for example.

The inner cover 22 is provided with a vent 27. The outer cover 23 is provided with a vent 28. After the components are attached to the inside of the base 21 and the inner cover 22 and the outer cover 23 are attached to the base 21, the air is removed from inside the housing 11 through the vents 27 and 28. Furthermore, the housing 11 is filled with a gas different from air.

The gas filling the housing 11 is, for example, a low density gas having a density lower than air, an inert gas having low reactivity, or the like. For example, the housing 11 is filled with helium inside. The inside of the housing 11 may be filled with another fluid. The inside of the housing 11 may be maintained at vacuum, low pressure close to vacuum, or negative pressure lower than atmospheric pressure.

The vent 28 of the outer cover 23 is closed by a seal 29. The seal 29 airtightly seals the vent 28 and prevents the fluid filling the housing 11 from leaking from the vent 28.

The plurality of magnetic disks 12 are arranged orthogonally to the Z direction. The diameter of the magnetic disk 12 is, for example, about 3.5 inches. The HDD 10 according to the present embodiment includes, for example, 11 or more magnetic disks 12. The diameter and the number of the magnetic disks 12 are not limited to this example.

Each of the plurality of magnetic disks 12 has, for example, at least one recording surface 31. The recording surface 31 is provided on at least one of the upper surface and the lower surface of the magnetic disk 12. In other words, each of the plurality of recording surfaces 31 is a surface of the magnetic disk 12 facing substantially the +Z direction or a surface of the magnetic disk 12 facing substantially the −Z direction. The recording surface 31 is a substantially flat surface orthogonal to the Z direction. The magnetic recording layer of the magnetic disk 12 is provided on the recording surface 31.

The spindle motor 13 supports the plurality of magnetic disks 12 stacked at intervals in the Z direction. The spindle motor 13 rotates the plurality of magnetic disks 12 around an axis Ax1 of the spindle motor 13. The axis Ax1 extends in the Z direction. The plurality of magnetic disks 12 is held by the hub of the spindle motor 13 with, for example, a clamp spring.

The HSA 14 is rotatably supported by a support shaft 35. The support shaft 35 is provided away from the magnetic disk 12 in a direction orthogonal to the axis Ax1. The support shaft 35 extends, for example, in the substantially +Z direction from the bottom wall 25 of the housing 11.

The HSA 14 can rotate about an axis Ax2. The axis Ax2 is an example of a virtual rotation axis extending in the Z direction. The axis Ax2 is, for example, the center of rotation of the HSA 14 and coincides with the axis of the support shaft 35.

Hereinafter, an axial direction, a radial direction, and a circumferential direction are defined for convenience. The axial direction is a direction along the axis Ax2. In the present embodiment, the axis Ax2 extends in the Z direction. Therefore, the axial direction includes the Z direction. The radial direction is a direction orthogonal to the axis Ax2, and includes a plurality of directions orthogonal to the axis Ax2. The circumferential direction is a rotational direction rotating around the axis Ax2, and includes a clockwise direction around the axis Ax2 and a counterclockwise direction.

The HSA 14 includes a carriage 41, a plurality of head gimbal assemblies (HGA) 42, and a flexible printed circuit board (FPC) 43. The carriage 41 includes an actuator block 51, a plurality of arms 52, and a frame 53.

The actuator block 51, the plurality of arms 52, and the frame 53 are integrally formed of, for example, an aluminum alloy. The materials of the actuator block 51, the arm 52, and the frame 53 are not limited to this example.

The actuator block 51 is supported by the support shaft 35 via, for example, a bearing so as to be rotatable about the axis Ax2. The plurality of arms 52 protrude radially outward from the actuator block 51. Therefore, the plurality of arms 52 is rotatable about the axis Ax2. The carriage 41 may be divided, and the arm 52 may protrude from each of the plurality of actuator blocks 51.

The plurality of arms 52 is disposed at intervals in the axial direction. Each of the arms 52 has a plate shape to enter a gap between two adjacent magnetic disks 12. The plurality of arms 52 extend substantially in parallel.

In the present embodiment, the carriage 41 includes 12 arms 52, for example. The number of the arms 52 is larger by one than the number of the magnetic disks 12. The number of the arms 52 is not limited to this example.

The frame 53 protrudes from the actuator block 51 in a direction opposite to the direction in which the arm 52 protrudes. The frame 53 holds a voice coil of the VCM 15. The VCM 15 includes the voice coil, a pair of yokes, and a magnet provided on the yoke.

Figure 2:
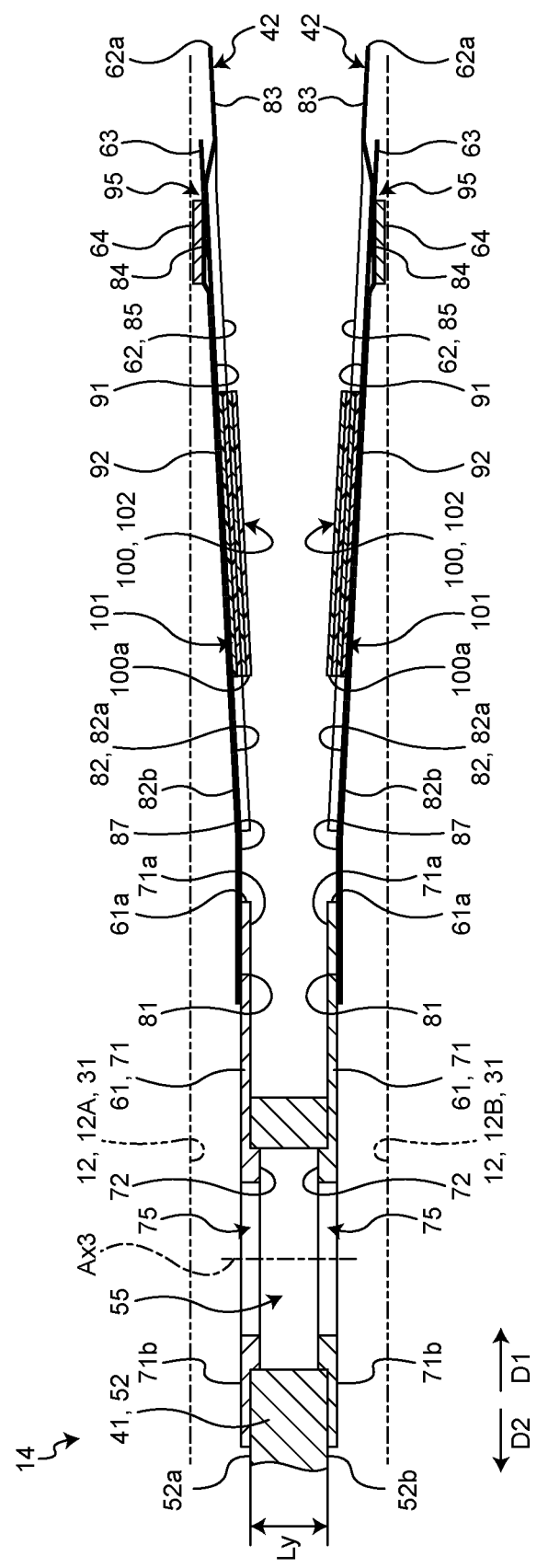
FIG. 2 is an exemplary cross-sectional view illustrating the HGA and the arm of the above embodiment.

FIG. 2 is an exemplary cross-sectional view illustrating the HGA 42 and the arm 52 of the present embodiment. As illustrated in FIG. 2, in the present specification, a first direction D1 and a second direction D2 are defined. The first direction D1 is one of a plurality of directions included in the radial direction, and is a direction facing outward in the radial direction. Therefore, the first direction D1 is a direction orthogonal to the axis Ax2. The second direction D2 is a direction opposite to the first direction D1.

The plurality of arms 52 protrude from the actuator block 51 in the first direction D1. That is, the first direction D1 and the second direction D2 are longitudinal directions of the arm 52. As the arm 52 rotates about the axis Ax2, the first direction D1 and the second direction D2 also rotate about the axis Ax2. The frame 53 protrudes from the actuator block 51 in the second direction D2.

Each of the plurality of arms 52 has two attachment surfaces 52a and 52b. The attachment surface 52a is an example of a first surface. The attachment surface 52b is an example of a second surface. The attachment surfaces 52a and 52b are located at the end of the arm 52 in the first direction D1. That is, the attachment surfaces 52a and 52b are spaced from the axis Ax2 in the first direction D1.

Each of the attachment surfaces 52a and 52b is a flat surface substantially orthogonal to the axis Ax2. The attachment surface 52a faces substantially in the +Z direction. The attachment surface 52b is opposite the attachment surface 52a and faces substantially in the −Z direction.

Each arm 52 can be located between two adjacent magnetic disks 12 by rotating around the axis Ax2. Hereinafter, two adjacent magnetic disks 12 corresponding to each of the plurality of arms 52 are referred to as magnetic disks 12A and 12B. The magnetic disk 12A is an example of one magnetic disk among 11 or more magnetic disks.

The magnetic disk 12A is separated from the magnetic disk 12B in the +Z direction. When the arm 52 is located between the magnetic disks 12A and 12B, the attachment surface 52a faces the recording surface 31 of the magnetic disk 12A. Meanwhile, the attachment surface 52b faces the recording surface 31 of the magnetic disk 12B.

Each arm 52 is provided with a through hole 55. The through hole 55 penetrates the arm 52 in the substantially Z direction. Thus, the through hole 55 opens to the attachment surfaces 52a and 52b. The through hole 55 is a hole having a substantially circular cross section. The cross section of the through hole 55 may have another shape. The axis Ax3 of the through hole 55 extends substantially in the Z direction.

That is, the axis Ax3 of the through hole 55 extends substantially parallel with the axis Ax2 of rotation of the HSA 14.

Each of the plurality of HGAs 42 is attached to the attachment surface 52a or the attachment surface 52b of the corresponding arm 52. Each of the plurality of HGAs 42 extends from the arm 52 in the first direction D1. As a result, the plurality of HGAs 42 is arranged at intervals in the axial direction.

Figure 3:
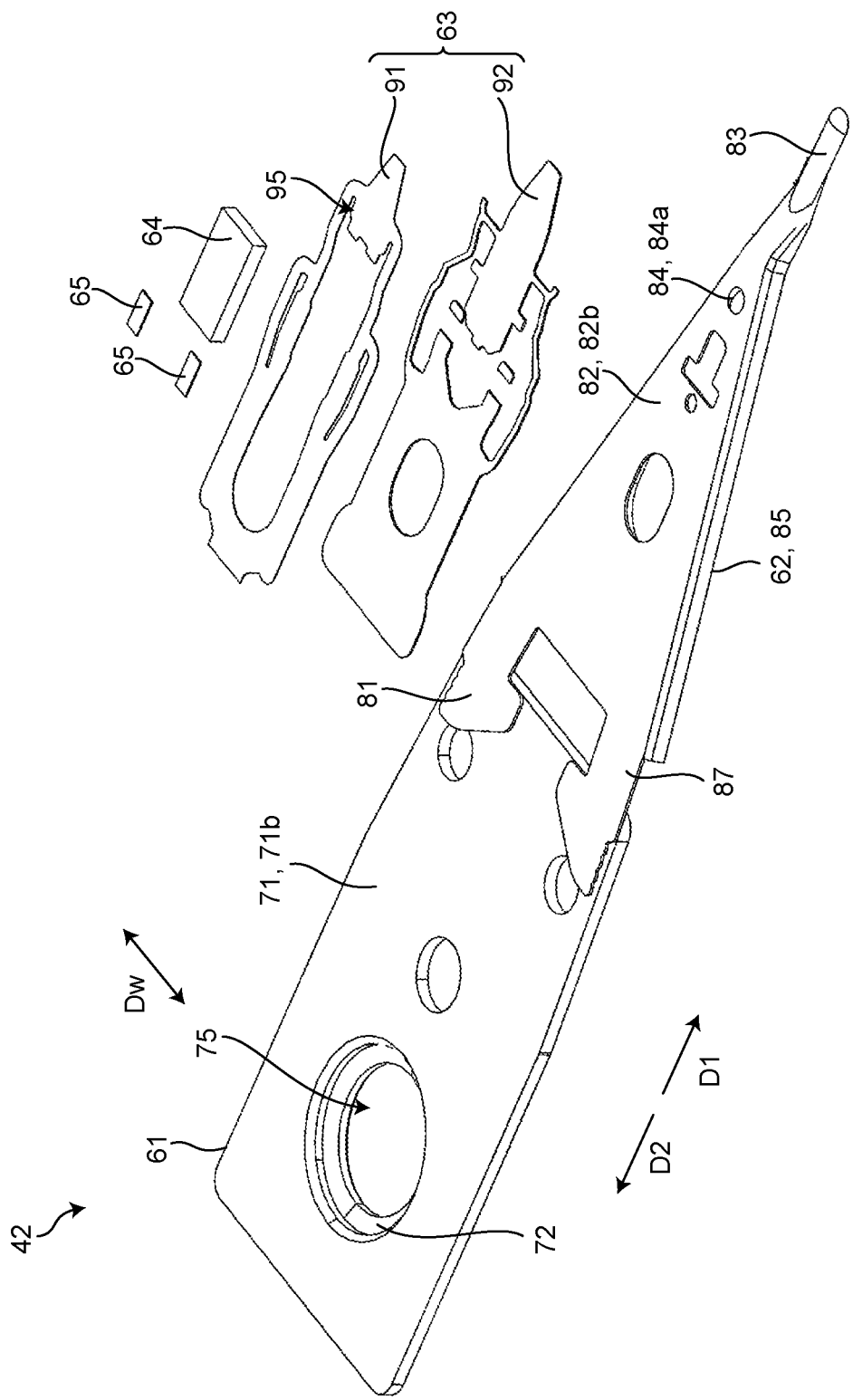
FIG. 3 is an exemplary perspective view illustrating the HGA of the above embodiment in an exploded manner.
Figure 4:
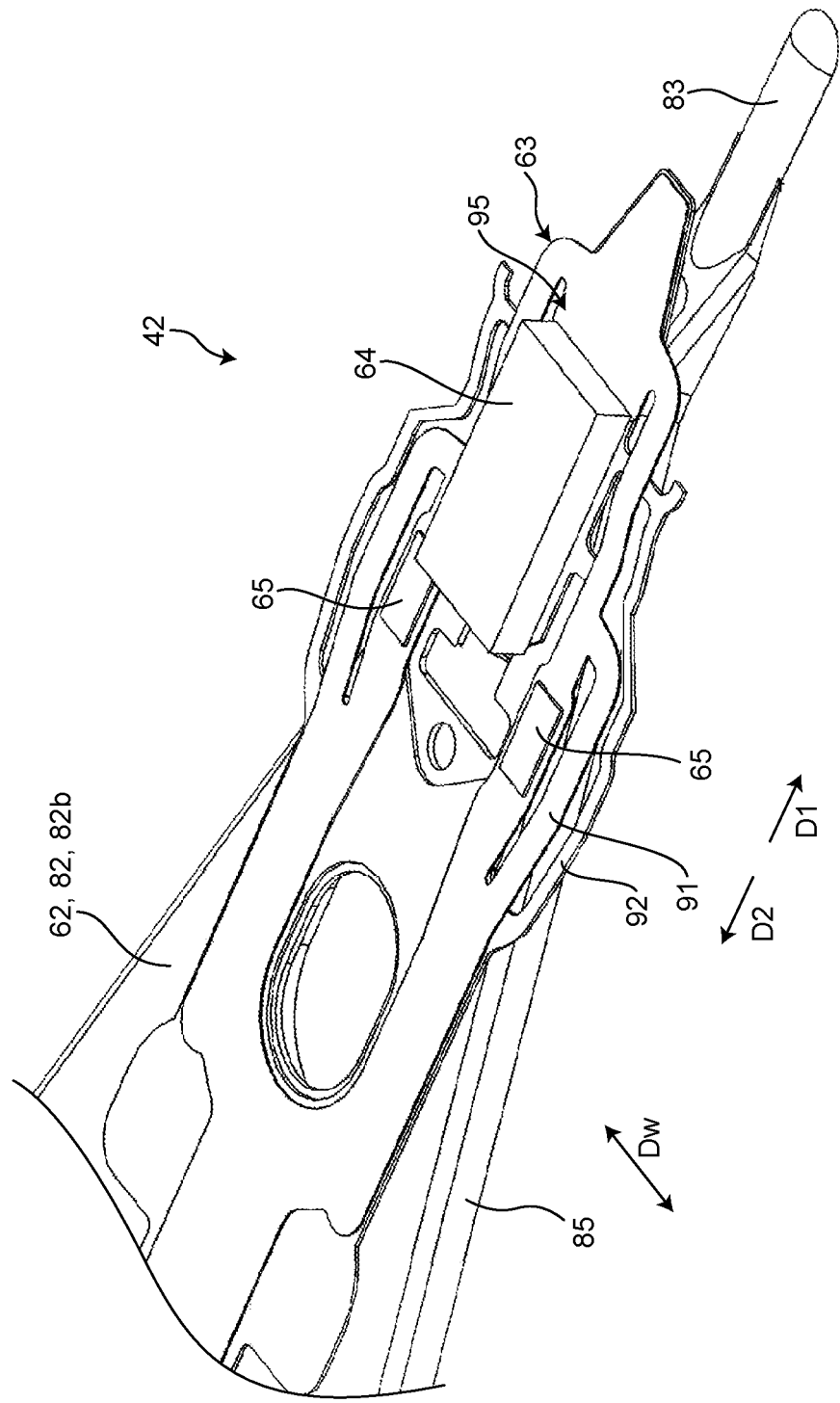
FIG. 4 is an exemplary perspective view illustrating a part of the HGA of the above embodiment.

In the following description, the HGA 42 attached to the attachment surface 52a will be mainly described. The HGA 42 attached to the attachment surface 52b can be understood by replacing the attachment surface 52a in the following description with the attachment surface 52b and replacing the magnetic disk 12A with the magnetic disk 12B. FIG. 3 is an exemplary perspective view illustrating the HGA 42 of the present embodiment in an exploded manner. FIG. 4 is an exemplary perspective view illustrating a part of the HGA 42 of the present embodiment. As illustrated in FIG. 3, each of the plurality of HGAs 42 includes a base plate 61, a load beam 62, a flexure 63, a magnetic head 64, and two piezoelectric elements 65. The magnetic head 64 may also be referred to as a slider. The piezoelectric element 65 may also be referred to as an actuator.

The base plate 61 and the load beam 62 are made of, for example, stainless steel. The base plate 61 and the load beam 62 may be made of other materials or may be made of materials different from each other.

As illustrated in FIG. 2, the base plate 61 is attached to the attachment surface 52a of the arm 52. Specifically, the base plate 61 is attached to the arm 52 away from the axis Ax2 in the first direction D1.

The base plate 61 includes a plate 71 and a boss 72. The boss 72 is an example of the first protrusion. The plate 71 has a substantially rectangular plate placed substantially orthogonally to the Z direction. The plate 71 has an inner side surface 71a and an outer side surface 71b. The inner side surface 71a is an example of a third surface.

The inner side surface 71a is substantially flat and faces the attachment surface 52a of the arm 52. The inner side surface 71a is supported by the attachment surface 52a. The outer side surface 71b is opposite the inner side surface 71a. The outer side surface 71b is substantially flat and faces the recording surface 31 of the magnetic disk 12A.

The boss 72 protrudes from the inner side surface 71a to fit into the through hole 55. The boss 72 has a substantially cylindrical shape extending along the axis Ax3. The boss 72 is fixed to the inner surface of the arm 52 forming the through hole 55 by, for example, caulking. Thus, the base plate 61 is attached to the arm 52.

The inner surface of the arm 52 forming the through hole 55 and the outer surface of the boss 72 are in contact with each other. For example, when the cross-sectional shape of the through hole 55 is not circular, the axis Ax3 of the through hole 55 is an axis of a portion of the through hole 55 formed (defined, sectioned) by an inner surface in contact with the outer surface of the boss 72. The axis Ax3 is not limited to this example.

The base plate 61 is provided with a through hole 75 axially penetrating the plate 71 and the boss 72. The axis of the through hole 75 coincides with the axis Ax3 of the through hole 55. The axis Ax3 of the through hole 75 may be different from the axis Ax3 of the through hole 55.

The load beam 62 illustrated in FIG. 3 has a plate shape thinner than the plate 71 of the base plate 61. The load beam 62 is attached to an end of the plate 71 in the first direction D1 and extends from the plate 71 approximately in the first direction D1.

The load beam 62 includes an attachment part 81, an extending part 82, a lift tab 83, a dimple 84, and two side rails 85. The dimple 84 is an example of the second protrusion. The attachment part 81 is attached to the plate 71 by welding, for example.

The extending part 82 extends from an end of the attachment part 81 in the first direction D1. The extending part 82 has a substantially triangular plate shape tapered in the first direction D1. The shape of the extending part 82 is not limited to this example.

As illustrated in FIG. 2, the extending part 82 extends obliquely with respect to the attachment surface 52a of the arm 52 from the attachment part 81 toward the magnetic disk 12A. In other words, the extending part 82 extends from the base plate 61 in a direction between the first direction D1 and a direction in which the attachment surface 52a of the arm 52 faces. That is, the load beam 62 is bent at a boundary 87 between the attachment part 81 and the extending part 82. The load beam 62 is not limited to this example.

The extending part 82 has an inner side surface 82a and an outer side surface 82b. The inner side surface 82a is an example of a fifth surface. The outer side surface 82b is an example of a fourth surface. The inner side surface 82a and the outer side surface 82b are substantially flat and opposite to each other.

The inner side surface 82a and the outer side surface 82b are inclined with respect to the attachment surface 52a of the arm 52 so as to be closer to the magnetic disk 12A as is further away from the arm 52. The inner side surface 82a faces in a direction between the first direction D1 and a direction in which the attachment surface 52b of the arm 52 faces. The outer side surface 82b faces in a direction between the second direction D2 and a direction in which the attachment surface 52a of the arm 52 faces. The outer side surface 82b faces the recording surface 31 of the magnetic disk 12A.

The lift tab 83 is provided at an end of the extending part 82 in the first direction D1. As illustrated in FIG. 3, the dimple 84 is located near the lift tab 83. The dimple 84 is a substantially hemispherical protrusion protruding from the outer side surface 82b of the extending part 82.

The flexure 63 has an elongated belt shape as illustrated in FIG. 4, and extends substantially in the radial direction along the arm 52, the base plate 61, and the load beam 62. The flexure 63 includes, for example, an FPC 91 and a backing layer 92.

The FPC 91 of the flexure 63 includes, for example, an insulating base layer, a conductive layer stacked on the base layer, and an insulating cover layer covering the conductive layer. The conductive layer of the FPC 91 includes a plurality of sets of wiring and a plurality of terminals. The FPC 91 is not limited to this example. The backing layer 92 is, for example, a flexible plate made of stainless steel. The backing layer 92 is attached to the base layer of the FPC 91 with, for example, an adhesive.

The flexure 63 includes a gimbal 95 (elastic support). The gimbal 95 is provided at an end of the flexure 63 in the first direction D1. The gimbal 95 is attached to the load beam 62 and is displaceable relative to the load beam 62. The gimbal 95 includes a part of the FPC 91 and a part of the backing layer 92. In the gimbal 95, the backing layer 92 is located between the FPC 91 and the load beam 62.

Figure 5:
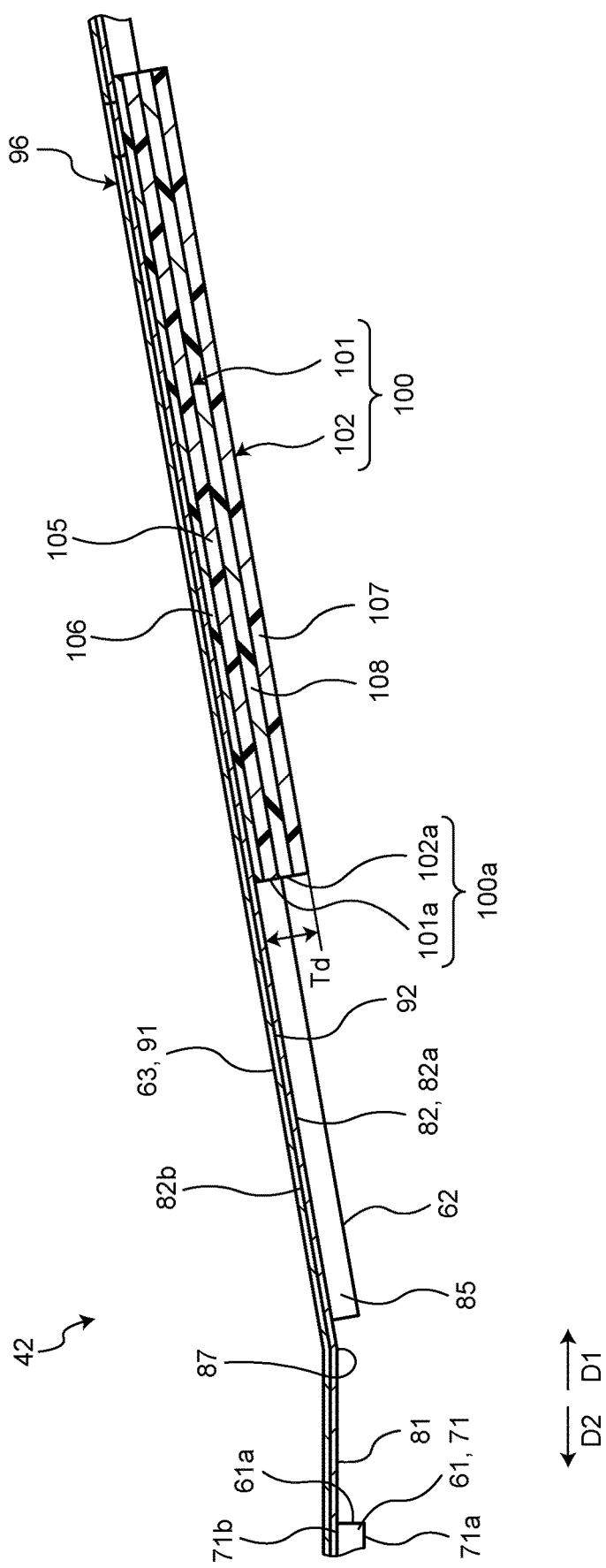
FIG. 5 is an exemplary cross-sectional view illustrating a part of the HGA of the above embodiment.

FIG. 5 is an exemplary cross-sectional view illustrating a part of the HGA 42 of the present embodiment. As illustrated in FIG. 5, the backing layer 92 of the flexure 63 is attached to the outer side surface 82b of the extending part 82 at the plurality of joints 96. At the joint 96, the load beam 62 and the backing layer 92 of the flexure 63 are joined together by spot welding, for example.

As illustrated in FIG. 1, an end of the flexure 63 in the second direction D2 is connected to one end of the FPC 43, for example, on the actuator block 51. The other end of the FPC 43 is connected to a connector provided on the bottom wall 25.

As illustrated in FIG. 4, the magnetic head 64 is mounted on the gimbal 95. In other words, the magnetic head 64 is mounted on the flexure 63 away from the axis Ax2 in the first direction D1 with respect to the base plate 61.

For example, the terminal of the FPC 91 is exposed in the gimbal 95. An electrode of the magnetic head 64 is bonded to the terminal by, for example, soldering. Thus, the FPC 91 of the flexure 63 is electrically connected to the magnetic head 64. For example, the bonding between the magnetic head 64 and the gimbal 95 may be reinforced with an adhesive. Further, the FPC 43 is electrically connected to the magnetic head 64 via the FPC 91 of the flexure 63.

The magnetic heads 64 record and reproduce information on and from the corresponding recording surfaces 31 of the plurality of magnetic disks 12. In other words, the magnetic heads 64 read and write information from and to the magnetic disks 12.

Each magnetic head 64 is supported by the dimple 84. As a result, the magnetic head 64 mounted on the gimbal 95 can rotate around the dimple 84 with respect to the load beam 62.

Figure 6:
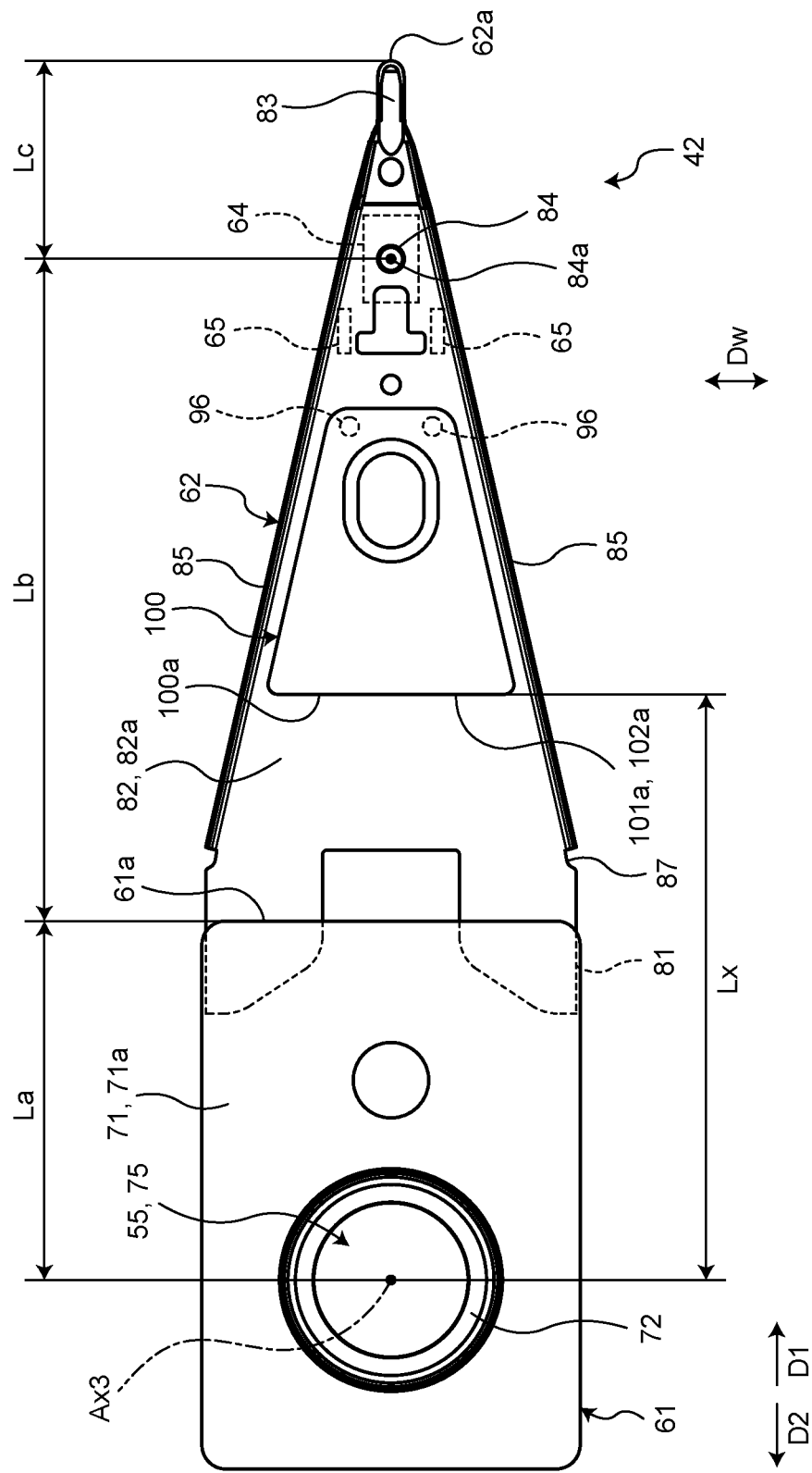
FIG. 6 is an exemplary plan view illustrating the HGA of the above embodiment.

FIG. 6 is an exemplary plan view illustrating the HGA 42 of the present embodiment. As illustrated in FIG. 6, the two side rails 85 protrude from both ends of the inner side surface 82a in the width direction Dw of the load beam 62. The width direction Dw is a direction along the inner side surface 82a and orthogonal to the first direction D1.

The piezoelectric element 65 is mounted on the gimbal 95. For example, the piezoelectric element 65 is bonded to a terminal provided on the FPC 91 of the gimbal 95 by soldering or with a conductive adhesive. Thus, the FPC 91 of the flexure 63 is electrically connected to the piezoelectric element 65.

At least a part of the piezoelectric element 65 is located between the base plate 61 and the magnetic head 64 in the first direction D1. The piezoelectric element 65 may be aligned with the magnetic head 64 in the width direction Dw. The plurality of joints 96 are located between the base plate 61 and the piezoelectric element 65 in the first direction. The position of the piezoelectric element 65 is not limited to this example.

The piezoelectric element 65 can expand and contract in the first direction D1 or the second direction D2 according to the applied voltage. Along with expansion and contraction of the two piezoelectric elements 65, the magnetic head 64 mounted on the gimbal 95 rotates, for example, in a substantially circumferential direction (seek direction).

The VCM 15 illustrated in FIG. 1 rotates the carriage 41 about the axis Ax2. As the carriage 41 rotates, the HGA 42 attached to the arm 52 also rotates. The carriage 41 rotates about the axis Ax2 to move the magnetic head 64 to a desired position along the recording surface 31 of the magnetic disk 12.

When the magnetic head 64 moves to the outermost periphery of the magnetic disk 12 by the rotation of the carriage 41 by the VCM 15, the ramp load mechanism 16 holds the magnetic head 64 at the unload position by supporting the lift tab 83. At the unload position, the magnetic head 64 is separated from the magnetic disk 12.

The PCB 17 is, for example, a rigid board such as a glass epoxy board, a multilayer board, or a build-up board. The PCB 17 is attached to the bottom wall 25 of the base 21 outside the housing 11.

Various electronic components such as a relay connector connected to the FPC 43, an interface (I/F) connector connected to the host computer, and a controller that controls the operation of the HDD 10 are mounted on the PCB 17. The relay connector is electrically connected to the FPC 43 via a connector provided on the bottom wall 25.

As illustrated in FIG. 6, the HGA 42 further includes a damper 100. The damper 100 is attached to the inner side surface 82a of the extending part 82. The damper 100 of the present embodiment covers a closest one of the plurality of joints 96 relative to the piezoelectric element 65. The damper 100 may further cover another joint 96.

As illustrated in FIG. 5, the thickness Td of the damper 100 is larger than the length of the side rail 85 in the direction orthogonal to the inner side surface 82a of the extending part 82. The thickness Td of the damper 100 may be equal to or less than the length of the side rail 85.

The damper 100 includes a first damper 101 and a second damper 102 overlaid on the first damper 101. The damper 100 may omit the second damper 102 or may further include another damper.

The first damper 101 is attached to the inner side surface 82a of the extending part 82 to attenuate vibration of the extending part 82. The second damper 102 is attached to the first damper 101 away from the load beam 62. The second damper 102 attenuates vibration of the first damper 101, and attenuates vibration of the extending part 82 via the first damper 101. As a result, the damper 100 attenuates the vibration of the load beam 62.

The first damper 101 includes a first constrained layer 105 and a first viscoelastic material (VEM) 106. The second damper 102 includes a second constrained layer 107 and a second viscoelastic material 108.

The first constrained layer 105 and the second constrained layer 107 are, for example, plates made of resin or metal and disposed along the inner side surface 82a of the extending part 82. The second constrained layer 107 may be different from the first constrained layer 105 in material, thickness in a direction orthogonal to the inner side surface 82a, and other properties.

The first viscoelastic material 106 and the second viscoelastic material 108 are made of, for example, a polymer material. Each of the first viscoelastic material 106 and the second viscoelastic material 108 has lower rigidity than both the first constrained layer 105 and the second constrained layer 107. The first viscoelastic material 106 may be different from the second viscoelastic material 108 in material, thickness in a direction orthogonal to the inner side surface 82a, and other properties.

For example, the first viscoelastic material 106 has more excellent vibration attenuation characteristics (damping characteristics) than the second viscoelastic material 108 at a relatively low temperature. The second viscoelastic material 108 has more excellent damping characteristics than the first viscoelastic material 106 at a relatively high temperature. The first viscoelastic material 106 is different in thickness from the second viscoelastic material 108. Thus, the second damper 102 is different from the first damper 101. The first damper 101 and the second damper 102 may be identical to each other.

The first viscoelastic material 106 is interposed between the first constrained layer 105 and the inner side surface 82a of the extending part 82. The first viscoelastic material 106 adheres to the first constrained layer 105 and to the inner side surface 82a.

The second viscoelastic material 108 is interposed between the first constrained layer 105 and the second constrained layer 107. The second viscoelastic material 108 adheres to the first constrained layer 105 and to the second constrained layer 107.

The first constrained layer 105 and the second viscoelastic material 108 are located between the first viscoelastic material 106 and the second constrained layer 107. The second constrained layer 107 is more spaced from the load beam 62 than the first constrained layer 105.

The vibration of the extending part 82, if it occurs, is transmitted to the first constrained layer 105 through the first viscoelastic material 106. The vibration of the first constrained layer 105 with respect to the extending part 82 causes the first viscoelastic material 106 to deform between the extending part 82 and the first constrained layer 105 and transform energy of the vibration into heat. Accordingly, the first damper 101 attenuates the vibration of the extending part 82.

The vibration of the extending part 82 is transmitted to the second constrained layer 107 through the first viscoelastic material 106, the first constrained layer 105, and the second viscoelastic material 108. The vibration of the second constrained layer 107 with respect to the first constrained layer 105 causes the second viscoelastic material 108 to deform between the first constrained layer 105 and the second constrained layer 107 to transform energy of the vibration into heat. As a result, the second damper 102 attenuates the vibration of the extending part 82 via the first damper 101.

When viewed in a direction orthogonal to the inner side surface 82a, a projection surface of the first damper 101 substantially matches a projection surface of the second damper 102. As illustrated in FIG. 6, the projection surface of the first damper 101 and the projection surface of the second damper 102 have a substantially trapezoidal shape tapered in the first direction D1. The shapes of the first damper 101 and the second damper 102 are not limited to this example.

The end 101a of the first damper 101 in the second direction D2 extends substantially linearly in the width direction Dw. The end 102a of the second damper 102 in the second direction D2 also extends substantially linearly in the width direction Dw.

The ends 101a and 102a of the first damper 101 and the second damper 102 overlap each other in a direction orthogonal to the inner side surface 82a. Therefore, the end 101a of the first damper 101 and the end 102a of the second damper 102 form the end 100a of the damper 100 in the second direction D2. The ends 101a and 102a of the first damper 101 and the second damper 102 are not limited to this example.

In the HDD 10 described above, for example, a controller of the PCB 17 controls the VCM 15 via, for example, the FPC 43, and controls the magnetic head 64 and the piezoelectric element 65 via the FPC 43 and the flexure 63.

The controller of the PCB 17 causes the VCM 15 to rotate the carriage 41 to move the magnetic head 64 to a desired position on the recording surface 31 of the magnetic disk 12. Furthermore, the controller of the PCB 17 adjusts the position of the magnetic head 64 by expanding and contracting the two piezoelectric elements 65.

By the expansion and contraction of the two piezoelectric elements 65, the excitation force is transmitted from the piezoelectric elements 65 to the load beam 62 via the joint 96. As a result, the load beam 62 may vibrate in a twisted manner. The damper 100 attenuates the vibration of the load beam 62.

Hereinafter, a method of attaching the HGA 42 to the arm 52, which is a part of the method of manufacturing the HDD 10, will be exemplified with reference to FIG. 7. The method of attaching the HGA 42 to the arm 52 is not limited to the following method, and other methods may be used.

Figure 7:
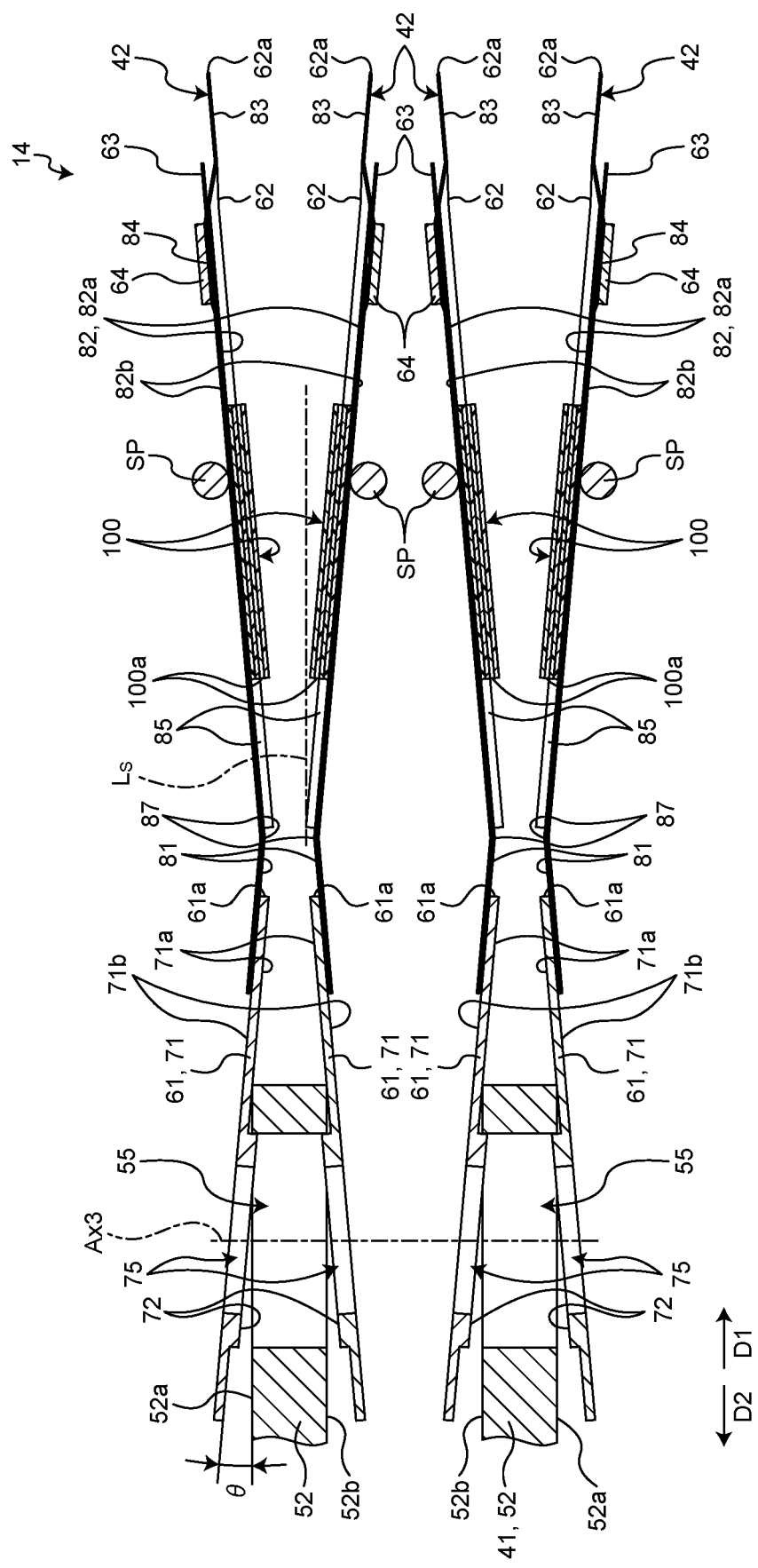
FIG. 7 is an exemplary cross-sectional view illustrating the HGA and the arm in a manufacturing process of the above embodiment.

FIG. 7 is an exemplary cross-sectional view illustrating the HGA 42 and the arm 52 in the manufacturing process of the present embodiment. As illustrated in FIG. 7, when the HGA 42 is attached to the arm 52, the base plate 61 is disposed on the attachment surface 52a of the arm 52.

The boss 72 of the base plate 61 is at least partially inserted into the through hole 55 of the arm 52. At least an end of the boss 72 in the first direction D1 is hooked on the inner surface of the arm 52. Furthermore, at least the end of the attachment surface 52a in the first direction D1 supports the inner side surface 71a of the plate 71.

Each of the HGAs 42 is supported by a separate pin SP. The separate pin SP is, for example, a bar-shaped jig extending in the width direction Dw. The separate pin SP is in contact with, for example, the flexure 63 and supports the HGA 42.

The separate pin SP maintains the interval between the HGA 42 located on the attachment surface 52a of one arm 52 and the HGA 42 located on the attachment surface 52b of the other arm 52. As a result, the separate pin SP prevents the magnetic heads 64 of the two HGAs 42 from interfering with each other.

Next, for example, the plate 71 is pressed against the attachment surface 52a of the arm 52 with a jig to insert the entire boss 72 into the through hole 55. Further, another jig is inserted into the through hole 75 of the base plate 61 to caulk the boss 72 to the inner surface of the arm 52. As a result, the HGA 42 is attached to the arm 52. When the attachment of the HGA 42 to the arm 52 is completed, the separate pin SP is removed from the HDD 10.

While the separate pin SP supports the HGA 42, the HGA 42 may be inclined with respect to the attachment surface 52a of the arm 52. For example, the plate 71 of the base plate 61 disposed on the attachment surface 52a is inclined with respect to the attachment surface 52a of the arm 52 so as to be closer to another HGA 42 located on the attachment surface 52b as is further away from the arm 52. As an example, an angle θ between the attachment surface 52a of the arm 52 and the inner side surface 71a of the plate 71 is approximately 5.6°.

Due to the inclined HGA 42, for example, the two HGAs 42 on the attachment surfaces 52a and 52b become closest to each other in the vicinity of the boundary 87 between the attachment part 81 and the extending part 82 of the load beam 62.

The HDD 10 according to the present embodiment makes it possible to prevent the two HGAs 42 from interfering with each other by setting the dimensions of the HSA 14 as in the following examples. Hereinafter, exemplary dimensions of the HSA 14 will be described. The following dimensions of the HSA 14 are merely exemplary and not intended to be construed as limiting.

The examples below will present dimensions of the HSA 14 when the load beam 62 is not bent at the boundary 87 and the attachment part 81 and the extending part 82 are substantially linear as illustrated in FIG. 6. In other words, the dimension between the base plate 61 and the attachment part 81 of the load beam 62 is set in a direction along the attachment surface 52a. Further, the dimensions of the extending part 82, the lift tab 83, and the dimple 84 of the load beam 62 are set in a direction along the inner side surface 82a of the extending part 82.

First Example

In a first example, a distance Lx between the end 100a of the damper 100 and the axis Ax3 of the through hole 55 is set to about 4.55 mm. The distance Lx is an example of the second distance. Further, a distance Ly between the attachment surface 52a and the attachment surface 52b of the arm 52 illustrated in FIG. 2 is set to about 0.5 mm. The distance Ly is an example of the first distance and corresponds to the thickness of the arm 52 including the attachment surfaces 52a and 52b. When the distance Ly is divided by the distance Lx, the value Ly/Lx is found as about 0.11.

A distance La between the axis Ax3 of the through hole 55 and the end 61a of the base plate 61 in the first direction D1 illustrated in FIG. 6 is set to about 4.76 mm. The distance La is an example of a sixth distance.

A distance Lb between the tip 84a of the dimple 84 and the end 61a of the base plate 61 is set to about 7.14 mm. The distance Lb is an example of a third distance. The tip 84a is a farthest part of the dimple 84 from the inner side surface 82a of the extending part 82.

A distance Lc between the tip 84a of the dimple 84 and the end 62a of the load beam 62 in the first direction D1 is set to about 2.18 mm. The distance Lc is an example of a fourth distance. The end 62a of the load beam 62 is included in the lift tab 83.

A value obtained by dividing the distance Lb by the distance Lc is referred to as a lever ratio Lb/Lc. The lever ratio Lb/Lc is about 3.28 in this example. A value obtained by dividing the sum of the distance La and the distance Lb by the distance La is referred to as a load beam ratio (La+Lb)/La. The load beam ratio (La+Lb)/La is about 2.5 in this example. The sum of the distance La and the distance Lb corresponds to the distance between the tip 84a of the dimple 84 and the axis Ax3 of the through hole 55 and is an example of a fifth distance.

The thickness Td of the damper 100 illustrated in FIG. 5 is set to about 7 mil. The unit mil is 0.001 inch, and may also be referred to as thou or milli-inch. 7 mil is equivalent to about 0.18 mm.

In the first example described above, the value Ly/Lx obtained by dividing the distance Ly by the distance Lx is set to 0.11 or less. The distance Lx is set to 4.5 mm or more, and the distance Ly is set to 0.5 mm or less. The distances Lx and Ly are not limited to this example as long as the value Ly/Lx is found as 0.11 or less. Further, the lever ratio Lb/Lc is set to 2.8 or more, and the load beam ratio (La+Lb)/La is set to 2.5 or more.

Second Example

In a second example, the distance Lx is set to about 4.91 mm and the distance Ly is set to 0.45 mm. The distances La, Lb, Lc and the thickness Td are the same as those in the first example. Thus, the value Ly/Lx obtained by dividing the distance Ly by the distance Lx is found as about 0.092.

In the second example described above, the thickness Td of the damper 100 is set to 7 mil or more, and the value Ly/Lx obtained by dividing the distance Ly by the distance Lx is set to smaller than 0.1. In addition, the distance Lx is set to 4.5 mm or more, and the distance Ly is set to 0.5 mm or less. The distances Lx and Ly are not limited to this example as long as the value Ly/Lx is found as less than 0.1.

Third Example

In a third example, the distance Lx is set to about 5.43 mm and the distance Ly is set to 0.45 mm. The thickness Td of the damper 100 is set to about 8 mil. The distances La, Lb, and Lc are the same as those in the first example. Thus, the value Ly/Lx obtained by dividing the distance Ly by the distance Lx is found as about 0.083. In the third example described above, the thickness Td of the damper 100 is set to 8 mil or more, and the value Ly/Lx obtained by dividing the distance Ly by the distance Lx is set to smaller than 0.09. In addition, the distance Lx is set to 4.5 mm or more, and the distance Ly is set to 0.5 mm or less. The distances Lx and Ly are not limited to this example as long as the value Ly/Lx is found as less than 0.09.

By setting the dimensions of the HSA 14 as in any of the first to third examples described above, the end 100a of the damper 100 in the second direction D2 can be located relatively far away from the boundary 87. Such arrangement can prevent the dampers 100 of the two HGAs 42 on the attachment surfaces 52a and 52b from interfering with each other.

For example, the two HGAs 42 become closest to each other not at the end 100a of the damper 100 in the second direction D2 but at the side rail 85. The virtual line Ls in FIG. 7 indicates a Z-directional position of a closest part of the side rail 85 relative to the other HGA 42. The damper 100 is further away from the other HGA 42 than the virtual line Ls.

In the HDD 10 according to some embodiments described above, the arm 52 rotates about the axis Ax2 and has the attachment surfaces 52a and 52b. The attachment surface 52a is spaced from the axis Ax2 in the first direction D1 orthogonal to the axis Ax2 to face one magnetic disk 12A. The attachment surface 52b is opposite the attachment surface 52a. The arm 52 is provided with the through hole 55 open to the attachment surfaces 52a and 52b. The base plate 61 has the inner side surface 71a facing the attachment surface 52a, and the boss 72 protruding from the inner side surface 71a to fit in the through hole 55. The load beam 62 is attached to the base plate 61 and has the outer side surface 82b and the inner side surface 82a. The outer side surface 82b is set to face one magnetic disk 12A. The inner side surface 82a is opposite the outer side surface 82b, and is inclined with respect to the attachment surface 52a so as to be closer to one magnetic disk 12A as is further away from the arm 52. The damper 100 is attached to the inner side surface 82a. The positional relationship among the attachment surface 52a and the attachment surface 52b, the damper 100, and the through hole 55 is such that the value obtained by dividing the distance Ly between the attachment surface 52a and the attachment surface 52b by the distance Lx between the end 100a of the damper 100 and the axis Ax3 of the through hole 55 is 0.11 or less, the end 100a of the damper 100 being in the second direction D2 opposite to the first direction D1. That is, the distance Lx can be set to a relatively large value. For attachment of two HGAs 42 to the arm 52, the two HGAs 42 are disposed on the attachment surfaces 52a and 52b of the arm 52. The separate pin SP holds the load beams 62 of the two HGAs 42 away from the arm 52 in the first direction D1 so that the load beams 62 approach each other. Because of this, the two HGAs 42 may become close to each other at the end 100a of the damper 100 in the second direction D2. However, due to the inclination of the inner side surface 82a and the relatively long distance Lx, the end 100a of the damper 100 in the second direction D2 can be relatively largely spaced from the damper 100 of the other HGA 42. In this manner, the dampers 100 of the two HGAs 42 can be prevented from interfering with each other in the HDD 10.

The distance Lx can be set to a relatively large value of 4.5 mm or more. This makes it possible to prevent the dampers 100 of the two HGAs 42 from interfering with each other in the HDD 10. Furthermore, the relatively long distance Lx allows setting of the relatively short distance Ly. This results in decreasing the arm 52 in thickness, which allows a larger number of magnetic disks 12A to be mounted in the HDD 10.

The distance Ly is set to 0.5 mm or less. That is, the arm 52 can have a relatively thin thickness. As a result, the HDD 10 can include a larger number of magnetic disks 12A, improving in storage capacity.

The load beam 62 includes the dimple 84 protruding from the outer side surface 82b to support the magnetic head 64. The positional relationship among the dimple 84, the base plate 61, and the load beam 62 is such that the value obtained by dividing the distance Lb between the tip 84a of the dimple 84 farthest away from the outer side surface 82b and the end 61a of the base plate 61 in the first direction D1 by the distance Lc between the tip 84a of the dimple 84 and the end 62a of the load beam 62 in the first direction D1 can be 2.8 or more. That is, the lever ratio Lb/Lc defined by dividing the distance Lb by the distance Lc can be set to a relatively large value. As such, the HDD 10 can reduce the vibration of the end 62a of the load beam 62 in the first direction D1.

The positional relationship among the dimple 84, the through hole 55, and the base plate 61 is such that the value obtained by dividing the distance La+Lb between the tip 84a of the dimple 84 and the axis Ax3 of the through hole 55 by the distance La between the end 61a of the base plate 61 in the first direction D1 and the axis Ax3 of the through hole 55 can be 2.5 or more. That is, the load beam ratio (La+Lb)/La defined by dividing the distance La+Lb by the distance La can be set to a relatively large value. As a result, the HDD 10 can reduce the vibration of the end 62a of the load beam 62 in the first direction D1.

The damper 100 includes a first damper 101 and a second damper 102 different from the first damper 101. The first damper 101 is attached to the inner side surface 82a. The second damper 102 is attached to the first damper 101 away from the load beam 62. Thus, the HDD 10 enables appropriate setting of the performance of the damper 100.

In the above description, "prevent" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
    11 or more magnetic disks;
    an arm with a through hole configured to rotate around a rotation axis, and having:
        a first surface spaced from the rotation axis in a first direction orthogonal to the rotation axis, to face one magnetic disk among the 11 or more magnetic disks, and
        a second surface being opposite the first surface, the through hole being open to the first surface and the second surface;
    a base plate having:
        a third surface facing the first surface, and
        a first protrusion protruding from the third surface to fit in the through hole;
    a load beam attached to the base plate and having:
        a fourth surface facing the one magnetic disk, and
        a fifth surface being opposite the fourth surface and inclined with respect to the first surface so as to be closer to the one magnetic disk as is further away from the arm; and
    a damper attached to the fifth surface, wherein
    a value obtained by dividing a first distance between the first surface and the second surface by a second distance between an end of the damper and an axis of the through hole is 0.11 or less, the end of the damper being in a second direction opposite to the first direction.

2. The disk device according to claim 1, wherein the second distance is set to 4.5 mm or more.

3. The disk device according to claim 1, wherein the first distance is set to 0.5 mm or less.

4. The disk device according to claim 1, further comprising:
    a flexure attached to the fourth surface; and
    a magnetic head mounted on the flexure and configured to read and write information from and to the one magnetic disk, wherein
    the load beam includes a second protrusion that protrudes from the fourth surface and supports the magnetic head, and
    a value obtained by dividing a third distance between a tip of the second protrusion farthest away from the fourth surface and an end of the base plate in the first direction by a fourth distance between the tip of the second protrusion and an end of the load beam in the first direction is 2.8 or more.

5. The disk device according to claim 1, further comprising:
    a flexure attached to the fourth surface; and
    a magnetic head mounted on the flexure and configured to read and write information from and to the one magnetic disk, wherein
    the load beam includes a second protrusion that protrudes from the fourth surface and supports the magnetic head, and
    a value obtained by dividing a fifth distance between a tip of the second protrusion farthest away from the fourth surface and the axis of the through hole by a sixth distance between an end of the base plate in the first direction and the axis of the through hole is 2.5 or more.

6. The disk device according to claim 1, wherein the damper includes:

a first damper attached to the fifth surface, and
a second damper being different from the first damper and attached to the first damper away from the load beam.

7. The disk device according to claim 1, wherein
the damper has a thickness of 7 mil or more in a direction orthogonal to the fifth surface, and
a value obtained by dividing the first distance by the second distance is smaller than 0.1.

8. The disk device according to claim 1, wherein
the damper has a thickness of 8 mil or more in a direction orthogonal to the fifth surface, and
a value obtained by dividing the first distance by the second distance is smaller than 0.09.

9. A head stack assembly comprising:
an arm with a through hole configured to rotate around a rotation axis, and having:
  a first surface spaced from the rotation axis in a first direction orthogonal to the rotation axis, and
  a second surface opposite the first surface, the through hole being open to the first surface and the second surface;
a base plate having:
  a third surface facing the first surface, and
  a first protrusion protruding from the third surface to fit in the through hole;
a load beam attached to the base plate and extending from the base plate in a direction between the first direction and a direction which the first surface faces, and having:
  a fourth surface facing a direction between the direction which the first surface faces and a second direction opposite to the first direction, and
  a fifth surface opposite to the fourth surface and facing a direction between the first direction and a direction which the second surface faces; and
a damper attached to the fifth surface, wherein
a value obtained by dividing a first distance between the first surface and the second surface by a second distance between an end of the damper and an axis of the through hole is 0.11 or less, the end of the damper being in the second direction.

* * * * *